Nov. 14, 1939.  K. C. D. HICKMAN ET AL  2,180,052
VACUUM DISTILLATION APPARATUS
Filed March 9, 1938   3 Sheets-Sheet 1
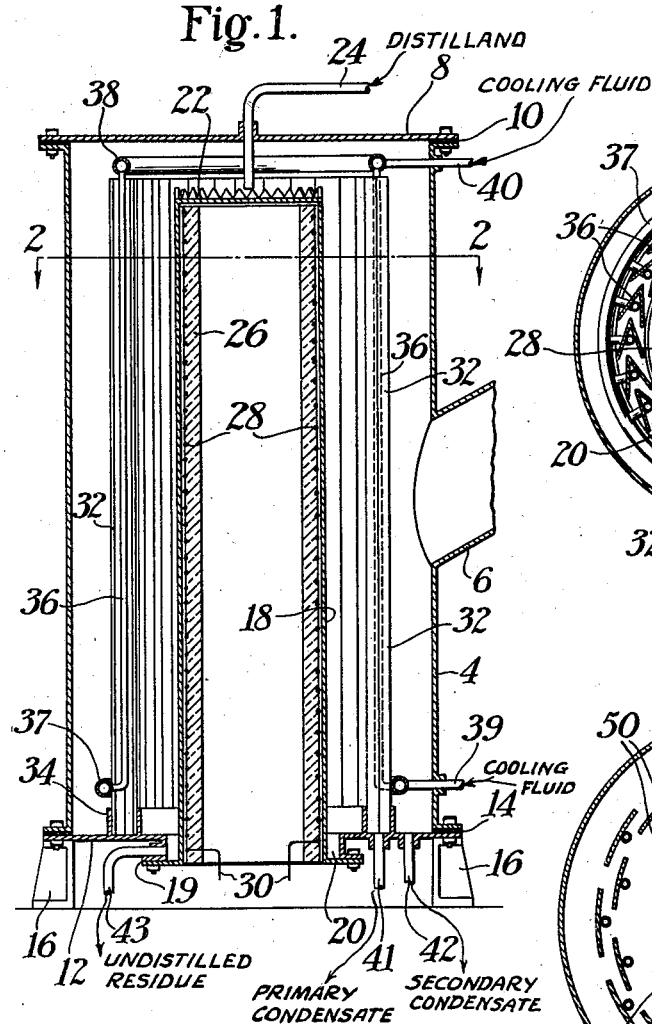
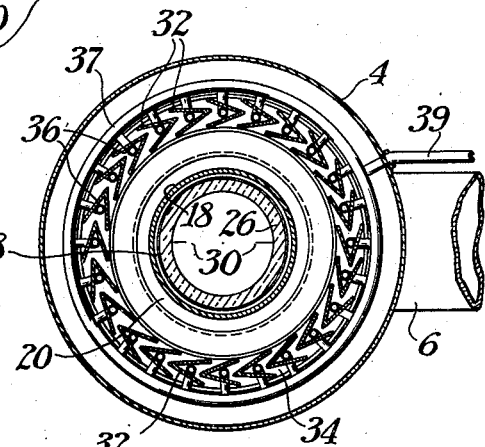
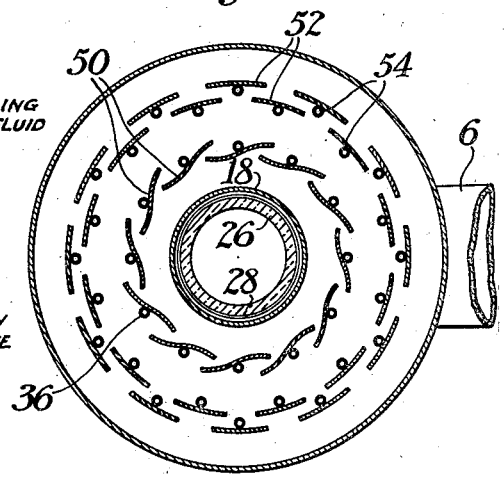
INVENTORS
Kenneth C. D. Hickman
John C. Hecker
BY
ATTORNEYS

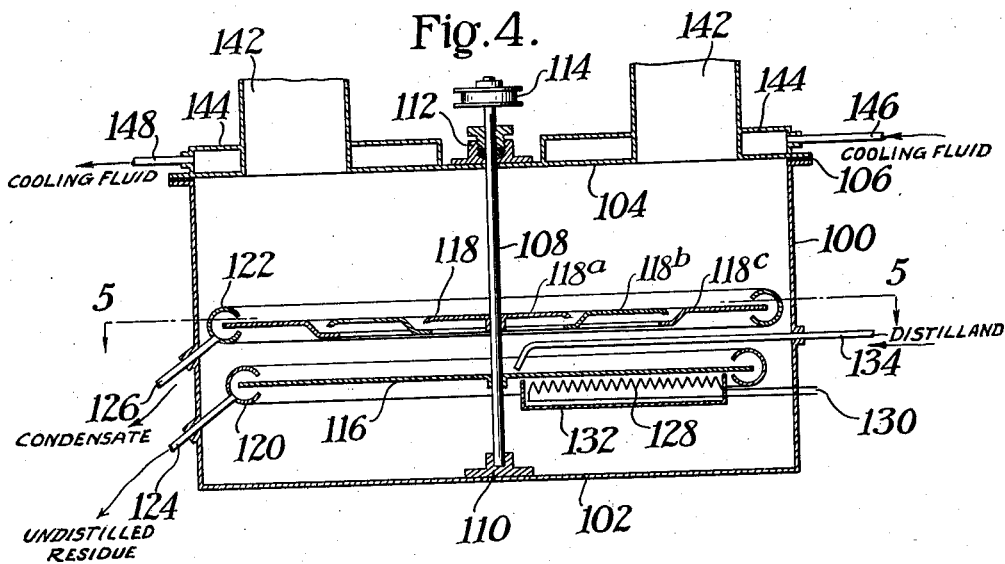
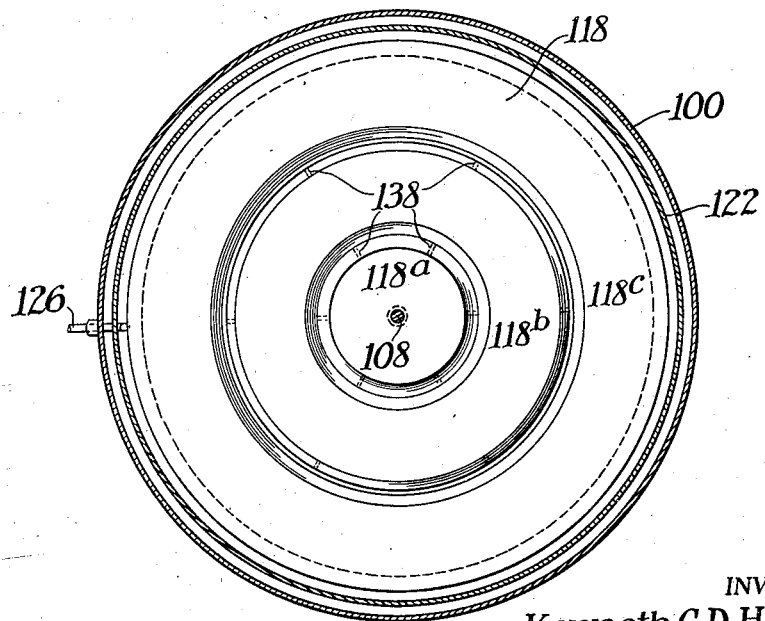

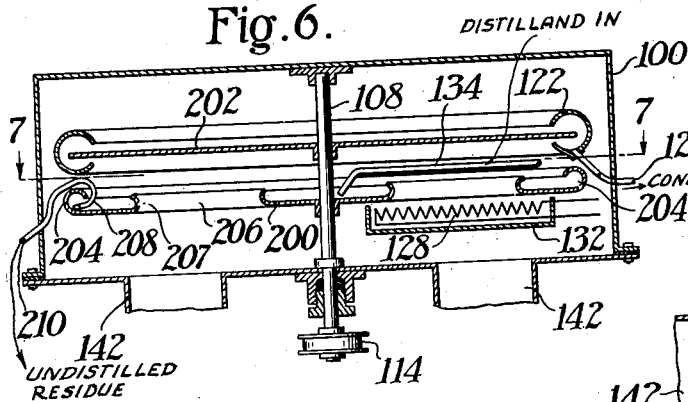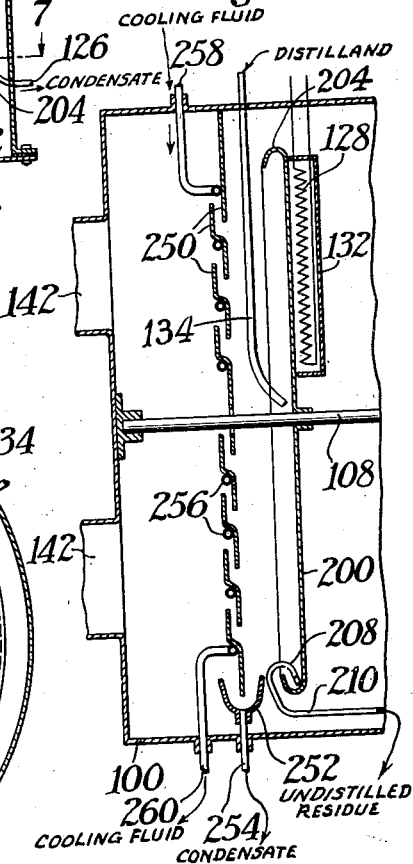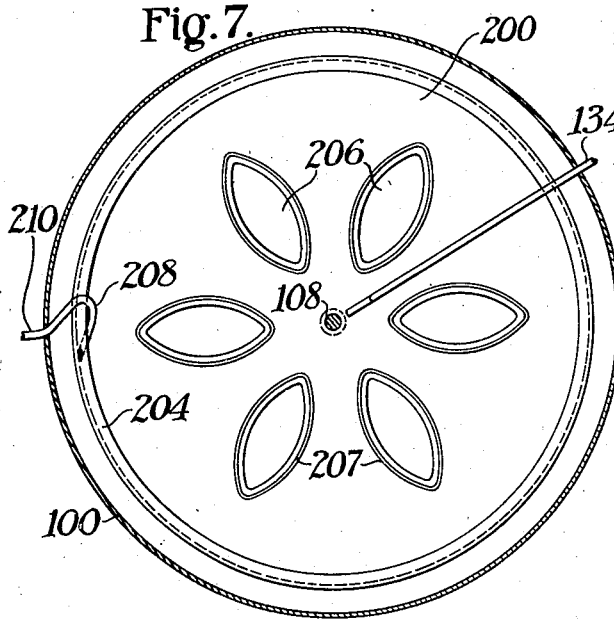

Patented Nov. 14, 1939

2,180,052

UNITED STATES PATENT OFFICE 2,180,052

VACUUM DISTILLATION APPARATUS

Kenneth C. D. Hickman and John C. Hecker, Rochester, N. Y., assignors, by mesne assignments, to Distillation Products, Inc., Rochester, N. Y., a corporation of Delaware Application March 9, 1938, Serial No. 194,901

13 Claims. (Cl. 202—205)

This invention relates to improvements in high vacuum distillation processes and apparatus and, particularly, to improvements in process and apparatus for high vacuum distillation wherein the vaporizing and condensing surfaces are separated by more or less unobstructed space.

During high vacuum distillation wherein the vaporizing and condensing surfaces are separated by substantially unobstructed space, such, for instance, as high vacuum, short path or molecular distillation, there are two kinds of gases in the space or gap between the two surfaces; one is the vapor of the molecules being distilled; the other is the residual gas. The residual gas is generally made up of two or more components, one being permanent gases present in the space because of leakage in the apparatus or evolved from the distilland. The second is condensible gas, namely volatile vapors evolved from the distilland which are non-condensible at the temperature of the condensing surface.

The distillate molecules in the gap do not seriously interfere with the issuance of new molecules from the surface of the distilland and, for this reason, it is possible to employ high saturation pressures of distilling molecules as explained in copending application, Serial No. 174,491, filed November 13, 1937, Hickman. The residual gas molecules regardless of their nature do, however, greatly affect the distillation. Their presence in the space between the vaporizing and condensing surface prevents distilling molecules from leaving the distilling surface and/or from reaching the condensing surface. This serious interference with distillation is especially troublesome when the distances between the vaporizing and condensing surfaces is short compared with the width, or shortest linear dimension of the surfaces. These residual gas molecules are less able to escape from the narrow gap, where they accumulate, and raise the pressure in the still, lowering the rate of distillation and causing destruction of valuable constituents.

This invention has for its object to provide vacuum distillation apparatus whereby the above difficulties are avoided. A further object is to provide vacuum distillation apparatus wherein the condensing and vaporizing surface are separated by substantially unobstructed space which permits rapid removal of residual gas from the space between these two surfaces. A still further object is to provide a vacuum distillation process and apparatus wherein the vaporizing and condensing surfaces are rather close together and wherein the residual gas molecules can be rapidly removed from the space between these two surfaces, thus preventing their interference with the distillation. A further object is to provide short path or molecular distillation apparatus which is provided with condensing and/or vaporizing surfaces which permit escape of residual gas molecules from the space therebetween. Other objects will become apparent from the following description.

These and other objects are accomplished in accordance with our invention which, in its more general aspects, comprises a high vacuum still provided with condensing and/or vaporizing surfaces which are substantially permeable to residual gas molecules, but substantially impermeable to distilling vapors. In this way residual gas molecules present in the space between the vaporizing surface and the condensing surface are permitted to pass directly through one or both surfaces into another region where they are quickly and effectively removed by the vacuum pumps. The distilling vapors, which cannot pass through the condenser without on the average at least one collision therewith, are condensed upon the condensing surface and are collected and withdrawn from the still in any desirable manner.

In the following description, examples and drawings, we have set forth several of the preferred embodiments of our invention, but it is to be understood that these are given for the purposes of illustration and not as limitations thereof.

In the accompanying drawings, wherein like numbers refer to like parts, we have illustrated vacuum stills embodying the principles of our invention; and wherein Fig. 1 illustrates a sectional elevation of a gravity flow still;

Fig. 2 is a horizontal section on line 2—2 of Fig. 1;

Fig. 3 is a horizontal section of a modification of the apparatus illustrated in Fig. 1 differing therefrom mainly in that a plurality of condensers embodying the principles of my invention are employed;

Fig. 4 is an elevation in section of a still provided with a permeable-impermeable condensing surface and wherein the vaporizing and condensing surfaces are caused to rotate during operation.

Fig. 5 is a plan in section taken on line 5—5 of Fig. 4.

Fig. 6 is an elevation in section of a still similar to that illustrated in Fig. 4, but provided with a porous vaporizing surface;

Fig. 7 is a horizontal section taken on line 7—7 of Fig. 6; and

Fig. 8 is an elevation in section of a still provided with a centrifugal vaporizing surface and a stationary condensing surface embodying the principles of our invention.

Referring to Figs. 1 and 2, numeral 4 designates a cylindrical casing provided with an integral evacuating conduit 6 which connects to vacuum pumps (not shown). The top of cylinder 4 is provided with a cover plate 8 which makes a gas tight seal with the top edge of 4 by means of a gasket 10. The cylinder 4 rests upon a base plate 12 and makes a gas tight joint therewith by means of sealing ring or gasket 14. The entire still assembly is supported by base plate 12 which is in turn mounted upon supports 16. A column 18 makes a removable but gas tight connection with base 12 at 19 and is located approximately concentric with external casing 4. Column 18 is also located in the center of the open portion of base plate 12 so as to form an annular gutter 20. The top edge of the column 18 is serrated and is closed by a plate 22 which is slightly recessed to form a small reservoir at the top thereof. Above this reservoir is located a conduit 24 integral with top plate 8. The internal column 18 serves as a vaporizing surface and is internally lagged with insulating material 26, within which is disposed a radiant heater comprising a resistance coil 28 heated by electricity introduced through leads 30.

A series of V-shaped members 32 are mounted in a vertical position within an annular trough 34 integral with the base plate 12. These elements serve as condensing surfaces and are preferably constructed of materials having fairly good heat conducting properties such as metals, although glass can be used. The series of V-shaped elements 32 are so associated that ample space is left between each pair of elements for flow of residual gas therethrough, but so that any molecule leaving any point on the vaporizing surface 18 must strike one of the condensing elements in passing therethrough. The condensing elements must be maintained at a temperature lower than that of the distilling vapors and this is accomplished by circulating cooling fluid through conduits 36 which are located in the narrow portion of each of the V-shaped condensing elements and in thermal contact therewith. The conduits 36 connect at the base to distributor head 37 and at the top to 38. Cooling fluid is introduced into this system through conduit 39 and withdrawn through conduit 40. The base of the condensing elements rest in the annular trough 34 which communicates with a withdrawal conduit 41. The annular space between gutter 34 and the wall of external casing 4 is connected to a conduit 42 and the gutter 20 is connected to conduit 43.

Referring to Fig. 3 wherein is illustrated apparatus substantially identical with that illustrated in Figs. 1 and 2 except for the fact that it is provided with a plurality of series of condensing surfaces of various shapes, numeral 50 designates condensing plates analogous to plates 32 of Fig. 1 and cooled by conduits 36 as in Fig. 1. These plates are arranged so that molecules leaving the surface of column 18 strike at least once while ample space between each element is available for passage of residual gas or non-condensed vapors. Numeral 52 designates a staggered series of plates which have ample openings for gas passage but which prevent passage of condensible vapors. These plates are cooled by cooling fluid circulated through conduits 54. Elements 50 and 52 rest in gutters which permit collection and withdrawal of condensate in the manner described in connection with plates 32 of Fig. 1.

Referring to Figs. 4 and 5, reference numeral 100 designates a cylindrical still casing provided with an integral base 102 and a removable top plate 104 which can be held in a gas tight manner by means of a sealing ring 106. A shaft 108 is mounted in a housing 110 integral with base plate 102 and in packed bearing 112 integral with top plate 104. The shaft is provided with a driving pulley 114 and with circular plate 116 and plate assembly 118 mounted thereon at right angles. The peripheries of plates 116 and 118 protrude into gutters 120 and 122 which communicate with withdrawl conduits 124 and 126 respectively. Under the circular plate 116 an electrically heated radiant heater 128 is mounted, which is connected to lead wires 130. A reflector 132 prevents loss of heat and serves to concentrate radiant heat from heater 128 upon the under surface of plate 116. A conduit 134 terminates above the central portion of 116 and serves to introduce distilland onto the upper surface of plate 116 at that point. Plate assembly 118 is constructed from a plurality of overlapping concentric rings 118 a, b and c which are rigidly held together by welded spacers 138 which have been eliminated from Fig. 4 for the purpose of clarity. The overlapping portions of elements 118 a, b and c are so shaped and arranged that openings of ample size are provided for passage of gas therethrough. Gases and volatile materials are removed from chamber or cylinder 100 by means of vacuum pumps (not shown) connected to evacuating conduits 142. Top plate 104 is provided with a jacket 144 into which cooling fluid is circulated by means of conduits 146 and 148. Plate 104 is, therefore, kept at a low temperature. Due to radiation and close proximity, condensing plate 118 is likewise cooled to the desired low temperature.

Referring to Figs. 6 and 7 numerals 200 and 202 designate vaporizing and condensing plates mounted upon shaft 108 within a still casing similar to that illustrated in Fig. 4. Vaporizing plate 200 is provided with openings 206 having turned edges 207. The periphery of plate 200 is turned upwards to form a gutter 204 into which a scoop 208 protrudes. Liquid collected by the scoop is removed through conduit 210.

In Fig. 8 the vaporizing plate rotates while the porous condenser remains stationary. Numeral 250 designates a series of condensing plates spaced apart so as to allow passage of gas therethrough. They are also arranged so that condensate will drop by gravity from one plate to another and finally into gutter 252 from which it can be removed by conduit 254. The condensing plates are cooled by conduits 256 in contact therewith and through which cooling fluid is circulated by introducing through 258 and withdrawal through 260.

In operation employing the apparatus of Figs. 1 and 2, distilland, such as a degassed cod-liver oil, is introduced through conduit 24 into the shallow reservoir at the top of central column 18 which is heated to distillation temperature by heating element 28. The space within the casing 4 is evacuated by means of high vacuum pumps connected to conduit 6. The oil overflows from the top reservoir and flows in the form of a thin film down the heated surface of column 18. Volatile materials and gases are evolved. The condenser elements 32 are cooled by circulating cooling fluid through conduits 36. The temperature of the condenser is regulated so that substances of the desired vapor pressure are condensed when they come in contact with the cooling elements. Non-condensed volatile vapors and residual gas remain uncondensed even after contact with the plates 32 and pass through the spaces between the baffles 36, usually after one or more collisions therewith. After passing through the baffles into the annular space between the condensing baffles 32 and the casing 4, these residual gases are efficiently removed by the pumps connected to conduit 6. Undistilled residue collects in the gutter 20 at the base of the column 18 and is withdrawn through conduit 43. Condensate collecting on the condensing elements 32 flows by gravity into annular gutter 34 and is removed therefrom through conduit 41. Casing 4 may be cooled to cause condensation thereon of the more volatile constituents which are not condensed at the temperature of the condensing elements 32. Such condensate flows to the base and is removed through conduit 42. Such procedure is, of course, optional.

During operation of the apparatus illustrated in Fig. 3, vaporization of constituents on the center column 18 takes place in the manner indicated above. Cooling fluid circulated through conduits 36 is maintained at a temperature higher than that circulated through conduits 54, so that condensing baffles 52 are at a lower temperature than the condensing baffles 50. The heavier or lowest vapor pressure constituents vaporized on the center column, condense upon the first series of condensing baffles 50 and are removed from the gutter at the base thereof in the manner described. Residual gas and the more volatile constituents pass through the condensing baffles 50 and impinge upon the second series of cool baffles 52. The more volatile constituents are here condensed at a lower temperature, flow down the elements 52 by gravity into the base gutter and are removed therefrom in a suitable manner. Residual gases pass through this outer ring of baffles with relative ease and are efficiently removed by vacuum pumps connected to conduit 6.

It will be appreciated that operation in the manner described greatly simplifies the problem of residual gas removal and increases the rate at which such gases can be withdrawn from the zone in which it exerts its harmful effects. The apparatus illustrated in Fig. 3 has the added advantage that fractional condensation can be secured under conditions of short path distillation where such a result was not hitherto obtainable. Fig. 3 illustrates the obvious fact that the condensing baffles can be constructed and arranged in a variety of forms.

During operation of the apparatus illustrated in Figs. 4 and 5 the vacuum pumps (not shown) connected to conduits 142 are put into operation. Shaft 108 is caused to rotate. Cooling fluid is introduced through conduit 146 and withdrawn through conduit 148 and heating element 128 is heated to a temperature sufficient to bring plate 116 to distillation temperature under the particular conditions employed. Distilland is introduced through conduit 134 onto the center of rotating plate 116. The distilland is thus caused to flow by centrifugal force to the periphery of plate 116 from which it is thrown into gutter 120 and is withdrawn from the still by way of conduit 124. While passing over the heated surface of 116, the distilland is in the form of a very thin film from which vaporization of desired constituents readily takes place. Vaporized molecules impinge upon condensing plate assembly 118 which is likewise rotating. These molecules are, therefore, condensed and thrown by centrifugal force from 118a to 118b, etc., and finally into gutter 122 from which the liquid condensate is withdrawn through conduit 126. Cooling of the condensing plate takes place by radiation from the cooled plate 104. Residual gas molecules easily pass from the distilling zone through the openings 138 and are removed by way of conduits 142.

The operation of the apparatus of Figs. 6 and 7 is quite similar to that of Fig. 4. However during operation residual gases pass through openings 206 in the vaporizing plate 200 and are removed by conduits 142. Undistilled residue is thrown by centrifugal force into gutter 204 where it is picked up by scoop 208 and delivered to conduit 210. Condenser plate 202 is cooled by radiation from the still casing which may be jacketed.

In Fig. 8 the vaporizing plate 200 operates as usual but the condensing plates 250 remain stationary and are positively cooled by coil 256. Residual gases pass through the spaces between the condensing elements and into conduits 142. Condensate on the condensing plates flows or drops from one plate to another and finally collects in gutter 252 from which it can easily be removed by conduit 254.

It will be appreciated that many changes can be made in the apparatus illustrated without departing from the spirit or scope of our invention. For instance, in the apparatus illustrated in Fig. 4, the condensing baffles can be stationary and slant slightly upwards so that condensate drains by gravity into the gutter 122. Gravity flow vaporizing surfaces which are provided with permeable openings can of course be employed. One such construction involves a vaporizing surface made of wire gauze heated by electricity. Obviously any number of vaporizing and condensing surfaces or plates could be employed, either connected in series or parallel. Both surfaces can be perforated if desired. Likewise, any desired number of condensing surfaces can be employed. Fig. 3 illustrates apparatus in which two such series are used. A greater number would, of course, be employed if more than two fractions were to be separated. It may be advantageous in some cases to maintain the series of plates at the same temperature. Obviously, the principles of our invention can be practiced with baffles of many different shapes other than those illustrated, the main requisites being that they offer slight resistance to passage of permanent gases but prevent molecules from the vaporizing surface from passing therethrough without at least about one collision.

It will be appreciated that the perforated or grid condensers can be maintained cold or warm. In the event that a warm grid is employed, its temperature should be cooler than that of the distilling surface. The cold grid is at or below the temperature of the surrounding atmosphere and, thus, is able to complete the work of condensation, leaving no vapors to be condensed elsewhere in the system.

When the grid is maintained warm, the condensate contains only the less volatile constituents of the distilling vapor and the more volatile constituents pass into the outer vacuum space where they are condensed separately or removed by the pumps. Where they are condensed separately a partial fractionating results leading to a degree of separation of an individual constituent greater than that obtainable under a single operation of ordinary unobstructed path or molecular distillation. The degree of separation or the number of fractions segregated is unlimited and depends solely upon the number of perforated condensers employed and their temperatures.

The procedure is suitable for vacuum distillation process in general, and is of particular value where pressures of below 1 mm. are employed with substantially unobstructed path of travel for vapors between the vaporizing and condensing surfaces. It is of particular advantage for short path high vacuum and particularly molecular distillations of all types regardless of the particular kind of substances treated or the distances of separation between the two surfaces. In such distillations the distance between the vaporizing surface and the condenser will ordinarily be short such as about 1 to 12 inches and the pressure therebetween less than about .1 mm. and preferably less than .01 mm., such as for instance .005 to .001 mm. or lower. With molecular distillation the distances between the surfaces should be about the order of the mean free path or less. When several perforated condensers are employed under molecular conditions, the distance between them may likewise be of the order of the mean free path of the residual gas molecules in the particular zone. It is possible that true molecular distillation will be occurring in such a case only in the outermost grids; because by the very definition of the process much of the vapor is not being condensed by the inner grids and the uncondensed molecules would be colliding with the heavier molecules. Such a condition would be analogous to the distillation conditions under high saturation pressures, such as described in a copending application No. 174,491 filed November 13, 1937, in the name of K. C. D. Hickman. Our invention is of decided advantage for carrying out distillations of this nature.

Instead of employing a lattice type grid, we can use a barrel made of perforated sheet or netting, the holes of which are small enough to preserve by surface tension an unbroken sheet of condensate. Both heavy and light constituents of the vapor condense, the lighter ones re-evaporating both towards the hot distilling surface and also by diffusion in the opposite direction from the outside of the gauze. A succession of gauzes can be employed if desired. With this construction, there are no exits for the truly uncondensable gases and we contemplate in such instances providing louvers for their escape. While the gauze construction can differ widely from the lattice construction, the lattice construction can be made up from strips of gauze.

It will be appreciated that the herein described invention greatly simplifies the problems of pumping and residual gas removal from the distilling zone of a high vacuum still as well as the problems of decomposition and loss in distillation rate caused by the presence of such gases in the apparatus of the prior art. Another outstanding advantage of the invention is that fractionation of vapors is possible under conditions which are either molecular or closely approach molecular.

What we claim is:

1. Vacuum distillation apparatus comprising in combination within a substantially closed chamber, a vaporizing and condensing surface separated by substantially unobstructed space, at least one of which surfaces is permeable to residual gas, but substantially impermeable to distilling molecules, cooling means for the condensing surface, heating means for the vaporizing surface, means for introducing distilland onto the vaporizing surface, means for removing undistilled residue from the vaporizing surface, evacuating means for removing residual gases from the chamber and means for withdrawing condensate, which has collected on the condensing surface, from the chamber.

2. Vacuum distillation apparatus comprising in combination within a substantially closed chamber, a vaporizing surface, a condensing surface separated from the vaporizing surface by substantially unobstructed space, which condensing surface is permeable to residual gas, but through which vapor molecules cannot pass without suffering on the average at least one collision therewith, means whereby the condensing surface is cooled to a temperature below that of the distilling vapors, means for heating the vaporizing surface, means for introducing distilland onto the vaporizing surface, means for removing undistilled residue from the vaporizing surface, evacuating means for removing the residual gas passing through the condenser from the chamber and means for withdrawing condensate, which has collected on the condensing surface, from the chamber.

3. Vacuum distillation apparatus comprising in combination within a closed chamber, a vaporizing surface which is permeable to residual gas, means for heating the vaporizing surface, a condensing surface located approximately opposite the vaporizing surface and separated therefrom by substantially unobstructed space, means whereby the condensing surface can be cooled to a temperature below that of the distilling vapors, means for removing condensate which collects upon the condenser, from the chamber, means for introducing distilland onto the vaporizing surface, means for removing undistilled residue from the vaporizing surface and a conduit connected to the chamber for removing gases therefrom.

4. Vacuum distillation apparatus comprising in combination within a closed chamber, a vaporizing surface, means for heating the vaporizing surface, a condensing surface located at a short distance from, and approximately opposite to the vaporizing surface and separated therefrom by substantially unobstructed space, which condensing surface is provided with openings which allow passage of residual gas, but which are so constructed that most distilling molecules leaving the vaporizing surface cannot pass without at least one collision therewith, means whereby the condensing surface can be cooled to a temperature below that of the distilling vapors, means for removing condensate which collects upon the condenser, from the chamber, means for introducing distilland onto the vaporizing surface, means for removing undistilled residue from the vaporizing surface and means for applying suction to the chamber.

5. A vacuum distillation apparatus comprising in combination within a closed chamber, a vaporizing surface provided with openings which allow passage of residual gas, means for heating the vaporizing surface, a condensing surface which is located a short distance from, and approximately opposite to the vaporizing surface and which is separated therefrom by substantially unobstructed space, means whereby the condensing surface can be cooled to a temperature below that of the distilling vapors, means for removing condensate which collects upon the condenser, from the chamber, means for introducing distilland onto the vaporizing surface, means for removing undistilled residue from the vaporizing surface and means for applying suction to the chamber.

6. Vacuum distillation apparatus comprising in combination within a closed chamber a perforated vaporizing surface, means for heating the vaporizing surface, a condensing surface of approximately the same or greater area than the vaporizing surface located at a short distance from and approximately parallel to the vaporizing surface, and separated from the vaporizing surface by substantially unobstructed space, which condensing surface is perforated so as to allow passage of residual gas therethrough, the perforations, however, being so located and constructed that distilling molecules leaving the vaporizing surface cannot pass through the condenser without at least one collision with the condensing surface, means whereby the condensing surface can be cooled to a temperature below that of the distilling vapors, means for removing condensate which collects upon the condensing surface and withdrawing it from the chamber, means for introducing distilland onto the vaporizing surface, means for removing undistilled residue from the vaporizing surface and a conduit connected to the chamber for removing gases therefrom.

7. Vacuum distillation apparatus comprising in combination within a closed chamber a vaporizing surface, means for heating the vaporizing surface, a plurality of condensing surfaces located at spaced distances from and approximately parallel to the vaporizing surface and separated therefrom by substantially unobstructed space, which condensing surfaces are provided with openings which allow passage of residual gas therethrough but which substantially prevent distilling molecules leaving the vaporizing surface from passing without collision with the condensing surfaces, means whereby the condensing surfaces can be independently cooled to temperatures below that of the distilling vapors, means for removing condensate which collects upon the condensing surfaces, means for introducing distilland onto the vaporizing surface, means for removing undistilled residue from the vaporizing surface and means for applying a suction to the inside of the closed chamber.

8. Vacuum distillation apparatus comprising in combination within a closed chamber, a substantially vertical column, means for heating the surface thereof, condensing surfaces substantially surrounding the column which are perforated in such a manner that residual gases can pass therethrough, but so that distilling molecules leaving the surface of the column cannot pass without at least one collision therewith, means whereby the condensing surfaces are cooled to a temperature below that of the distilling vapors, means for collecting condensate from the condensing surfaces and removing it from the chamber, means for introducing distilland onto the top outside surface of the column, means for collecting undistilled residue at the bottom of the column and removing it from the still and a conduit connected to the chamber for removing gases therefrom.

9. Vacuum distillation apparatus comprising in combination within a closed chamber a substantially vertical column, means for heating the surface thereof, a plurality of approximately concentric condensing surfaces surrounding the column at spaced distances which condensing surfaces are perforated in such a manner that residual gas can pass therethrough, but so that distilling molecules leaving the surface of the column cannot pass without at least one collision therewith, means whereby the condensing surfaces can be cooled to a temperature below that of the distilling vapors, means for collecting condensate from the condensing surfaces and removing it from the chamber, means for introducing distilland onto the top outside surface of the column, means for collecting undistilled residue at the bottom of the column and removing it from the still and means whereby gases can be removed from the space within the chamber.

10. Vacuum distillation apparatus comprising in combination within a closed chamber a rotatable vaporizing surface, means for rotating the vaporizing surface, means for heating the vaporizing surface, means for applying distilland onto the vaporizing surface, means for removing undistilled residue from the vaporizing surface, a condensing surface located approximately opposite to the vaporizing surface, which condensing surface is perforated in such a manner that residual gas molecules can pass therethrough, but so that distilling molecules leaving the vaporizing surface cannot pass without at least one collision therewith, means whereby the condensing surface is cooled to a temperature below that of the distilling vapors, means for removing condensate from the condensing surface and a conduit connected to the chamber for removing gases therefrom.

11. Vacuum distillation apparatus comprising in combination within a closed chamber a rotatable vaporizing surface which is permeable to residual gas, means for heating the vaporizing surface, means for applying distilland onto the approximate center of the surface, means for removing undistilled residue from near the periphery of the surface, a condensing surface located opposite to the vaporizing surface, means whereby the condensing surface is cooled to a temperature below that of the distilling vapors, means for removing condensate from the condensing surface and a conduit connected to the chamber for removing gases therefrom.

12. Vacuum distillation apparatus comprising in combination within a closed chamber, a vaporizing surface, means for heating the vaporizing surface, a condensing surface separated from surface, the vaporizing surface by substantially unobstructed space, which condensing surface is provided with openings which permit passage of residual gas therethrough, but through which vapor molecules cannot pass without on the average suffering at least one collision with the condensing surface, means whereby the condensing surface can be cooled to a temperature below that of the distilling vapors, means for removing condensate which collects upon the condenser, means for introducing distilland onto the vaporizing surface, means for removing undistilled residue from the vaporizing surface and means for applying suction to the chamber.

13. Vacuum distillation apparatus comprising in combination within a closed chamber, a rotatable vaporizing surface, means for rotating vaporizing surface, means for heating the vaporizing surface, means for applying distilland onto the vaporizing surface, means for removing undistilled residue from the vaporizing surface, a condensing surface which is separated from the vaporizing surface by substantially unobstructed space, which condensing surface is provided with openings which allow passage of residual gas, but through which vapor molecules cannot pass without on the average suffering at least one collision therewith, means whereby the condensing surface is cooled to a temperature below that of the distilling vapors, means for removing condensate from the condensing surface and a conduit connected to the chamber for removing gases therefrom.

KENNETH C. D. HICKMAN.
JOHN C. HECKER.